United States Patent
Komura et al.

[11] Patent Number: 5,412,948
[45] Date of Patent: May 9, 1995

[54] HYDROSTATIC CONTINUOUSLY VARIABLE TRANSMISSION

[75] Inventors: Norio Komura; Hiroshige Makita, both of Tokyo; Tomoaki Ishikawa, Saitama; Taro Miyakawa, Tokyo, all of Japan

[73] Assignee: Honda Giken Kogyo Kabushiki Kaisha, Tokyo, Japan

[21] Appl. No.: 120,524

[22] Filed: Sep. 14, 1993

Related U.S. Application Data

[63] Continuation-in-part of Ser. No. 987,752, Dec. 9, 1992, Pat. No. 5,356,347.

Foreign Application Priority Data

Oct. 23, 1992 [JP] Japan .................. 4-309680

[51] Int. Cl.⁶ ............................................. F16D 31/02
[52] U.S. Cl. .............................. 60/468; 137/517; 137/504; 137/539.5; 60/489
[58] Field of Search ............ 60/468, 489; 91/468; 137/107, 504, 517, 539.5; 417/299

[56] References Cited

U.S. PATENT DOCUMENTS

| | | |
|---|---|---|
| 3,522,999 | 8/1970 | Liles ........................ 417/299 |
| 4,349,043 | 9/1982 | Christensen ............... 137/517 |
| 4,589,393 | 5/1986 | Jourde et al. ............. 137/517 |
| 4,704,097 | 1/1987 | Dittrich . |
| 4,765,228 | 8/1988 | Wagenseil . |
| 4,942,786 | 11/1987 | Sakai . |
| 4,973,288 | 11/1990 | Sakakibara et al. . |
| 5,125,291 | 6/1992 | Makita et al. . |

FOREIGN PATENT DOCUMENTS 62-253967  5/1987  Japan .

*Primary Examiner*—F. Daniel Lopez
*Attorney, Agent, or Firm*—Howard L. Rose

[57] ABSTRACT

A ball and piston valve for controlling the flow of hydraulic fluid to a motive means have the ball and piston spring biased in opposing directions and with both initially subject to a first hydraulic fluid pressure that allows the springs to cause the ball to be unseated from its seat whereby fluid is directed to a fluid tank and wherein the ball is of sufficiently larger diameter than the piston that upon an increase in fluid pressure the ball is seated and remains seated when the pressure drops to the first hydraulic fluid pressure whereby the motive means to which the fluid is directed when the ball is seated does not have a sudden lurch upon a subsequent increase in pressure.

6 Claims, 2 Drawing Sheets

HYDROSTATIC CONTINUOUSLY VARIABLE TRANSMISSION

RELATED APPLICATION

This application is a continuation-in-part of U.S. application Ser. No. 07/987,752, filed Dec. 9, 1992, now U.S. Pat. No. 5,356,347 for "Hydrostatic Continuously Variable Transmission".

FIELD OF THE INVENTION

The present invention relates to a hydrostatic continuously variable transmission for transmitting drive power from a power source, such as an engine, to drive wheels of a working vehicle, for example.

BACKGROUND OF THE INVENTION

In the parent application, there is provided a hydrostatic valve, particularly in FIGS. 8 and 10 of said application. The valve is employed with hydraulic motors, see FIG. 1 (FIG. 7 of the parent application, the description of which is incorporated herein by reference) configured to prevent creep of, primarily, riding type lawn mowers when the mower is in an idling condition. The valve of the aforesaid application reduce the problem of the mower moving suddenly, jumping, when the hydraulic pump employed to provide working fluid to the vehicle's hydraulic motor, is first turned on.

The prior application provided a ball valve, FIGS. 2 and 3 (FIGS. 8 and 10 of the parent application, the description of which is incorporated herein by reference) that responds automatically to changes in hydraulic pressure. Initially, under idling conditions the valve is open and permits oil under low pressure to drain directly to the oil tank and the hydraulic motor is not driven. Specifically, the ball floats in the open position maintaining flow to the oil tank. As pointed out in the parent application, if the swash plate of the pump is not properly set the pressure supplied will cause the mower to creep. In the parent case, the ball of the valve floats during low pressure periods having a closing threshold above that normally encountered as a result of an improperly adjusted swash plate.

A problem may arise, however, if the pump is returned to idling condition and then started up again. When the pump is returned to the idling condition, the ball floats and when high pressure is applied again, the mower may jump.

OBJECTS OF THE INVENTION

It is an object of the present invention to provide a hydraulic valve that prevents jumping of the object driven by a hydraulic motor upon increasing energy supplied to the motor after a prior idling period.

It is yet another object of the present invention to employ opposing ball and piston members in a hydraulic valve wherein the diameter of the ball is greater than the diameter of the piston such that once the ball is seated on its valve seat and blocks flow to the oil tank, the ball remains engaged with its seat even through the supply pressure falls below the idle pressure that initially would permit the ball to float.

It is still another object of the present invention to provide a hydraulic valve interposed between a source of hydraulic fluid and in the alternative, an oil tank or a hydraulic motor, the valve initially providing communication between the pump and oil tank but upon an increase in the pressure of the oil, the valve blocks such connection and directs pressurized hydraulic fluid to the motor and maintains flow of fluid to the motor as long as the pressure of the fluid is above a predetermined pressure which may be and preferably is lower than the initial pressure that caused the fluid to flow to the hydraulic motor.

BRIEF DESCRIPTION OF THE PRESENT INVENTION

A valve for controlling the flow from a hydraulic pump to alternatively a hydraulic fluid tank or to a hydraulic motor to drive, preferably, a riding lawn mower, responds (1) initially to a pressure below a certain level to direct flow of fluid to the hydraulic fluid tank, (2) subsequently responds to a pressure above a certain level to terminate flow to the tank and direct it to the hydraulic motor and (3) maintains flow to the hydraulic motor even though the pressure of the fluid falls below that initially required to cause flow to be diverted to the motor.

The valve comprises two chambers and for purposes of reference only, an upper chamber and a lower chamber. A ball of a ball valve is disposed in an upper larger diameter chamber and a piston of lesser diameter than the ball is disposed in the lower small diameter chamber which communicates with the upper chamber, the terms "upper" and "lower" being used for convenience and not in a restrictive sense. The ball and piston are spring biased toward one another, the spring of the piston being stronger and forcing the piston against the ball, causing it to be lifted from its valve seat.

Hydraulic fluid under pressure from a pump enters the upper chamber and when the pressure of the fluid is below a first threshold the ball floats. Fluid flows past the ball and through or around the piston through the lower chamber and to the storage tank. Upon an increase in the pressure into the upper chamber, the ball being of larger diameter than the piston is forced by the pressure of the oil against its seat. Flow is now diverted to the hydraulic motor. A reduction in pressure below the first threshold to a second threshold does not permit the ball to become unseated as a result of its diameter being larger than that of the piston. Thus, undue lurching of the mower is avoided when the pump falls to ideal speed and is subsequently accelerated since hydraulic fluid was never diverted from the motor.

The above and other features, objects and advantages of the present invention, together with the best means contemplated by the inventors thereof for carrying out their invention will become more apparent from reading the following description of a preferred embodiment and perusing the associated drawing in which:

DETAILED DESCRIPTION OF THE PRESENT INVENTION

Figure 3:
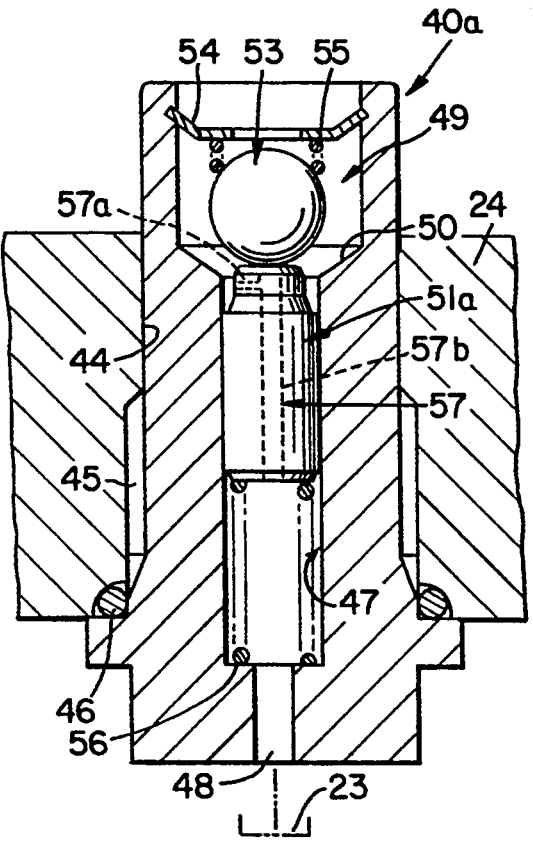
FIG. 3 is a cross-sectional view of a modified pressure-responsive valve.
Figure 4:
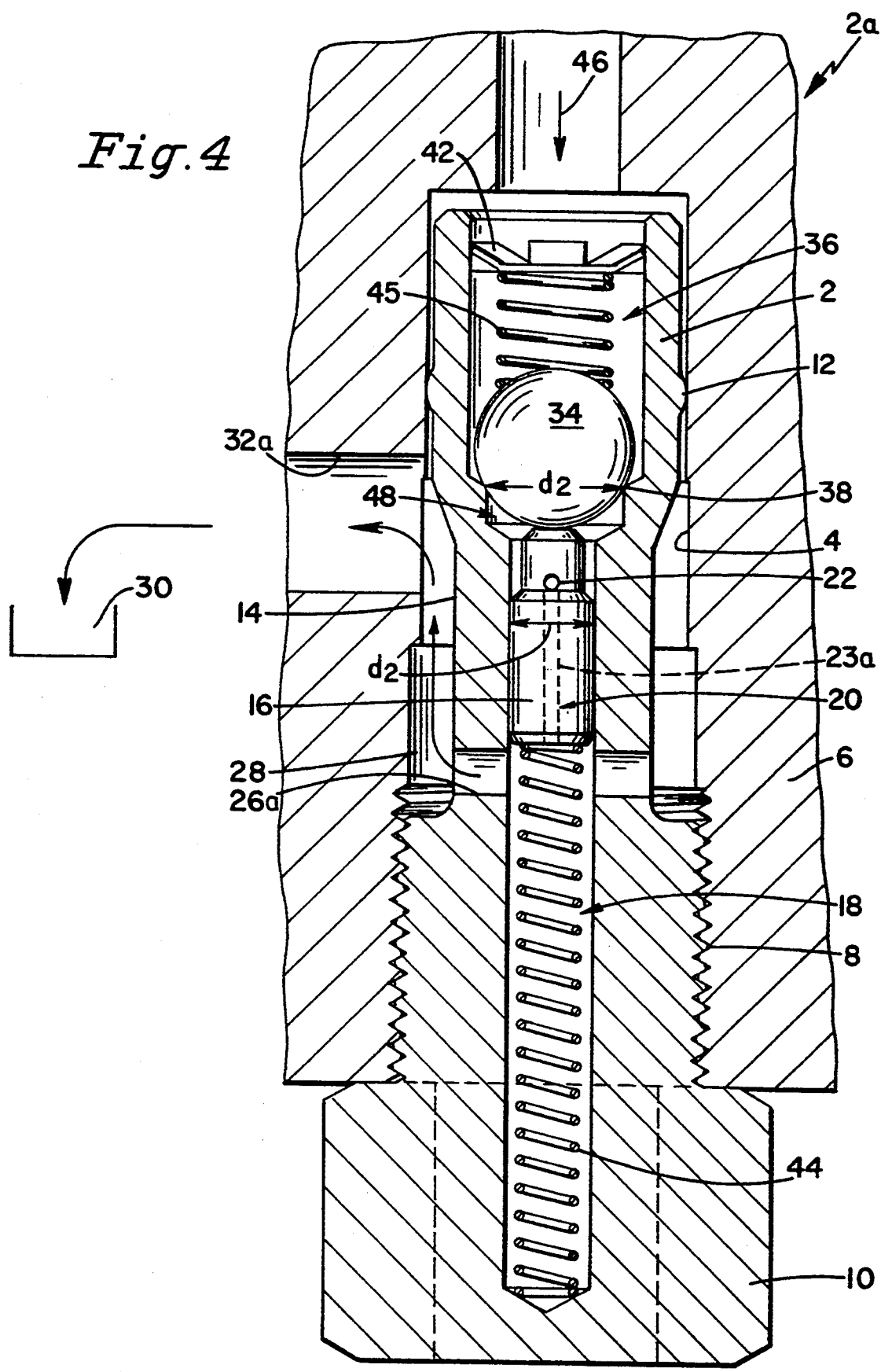
FIG. 4 illustrates the valve of the present invention, partially in cross section and partially in plan.

Referring to FIG. 4 of the accompanying drawings, a plug-like cylindrical body 2 of pressure responsive valve 2a, containing valve body 20 is inserted in an attachment hole 4 defined in a base plate 6, and includes an externally threaded surface 8 threaded in the attachment hole 4 and a flange 10 positioned outside of the attachment hole 4. Further, the cylindrical body 2 includes an externally convex region 12 formed on an upstream circumferential surface thereof for sealing and a smaller-diameter region 14 formed on a middle circumferential surface thereof. A piston 16 is slidably disposed in a second oil chamber 18 and has an orifice 21 of a radial inlet passage 22 and an axial main passage 23 similar to those of FIG. 3 (FIG. 10 of the parent application).

In particular, the second oil chamber 18 defined in the cylindrical body 2 is in communication with a radial outlet passage 26 opening on the smaller-diameter region 14. The oil flows from the second oil chamber 18 to this radial outlet passage 26 and a circumferential passage 28 defined between an inner surface of the attachment hole 4 and the smaller-diameter portion 14, and then is drained into an oil tank 30 through an oil passage 32 defined in the base plate 24.

Figure 1:
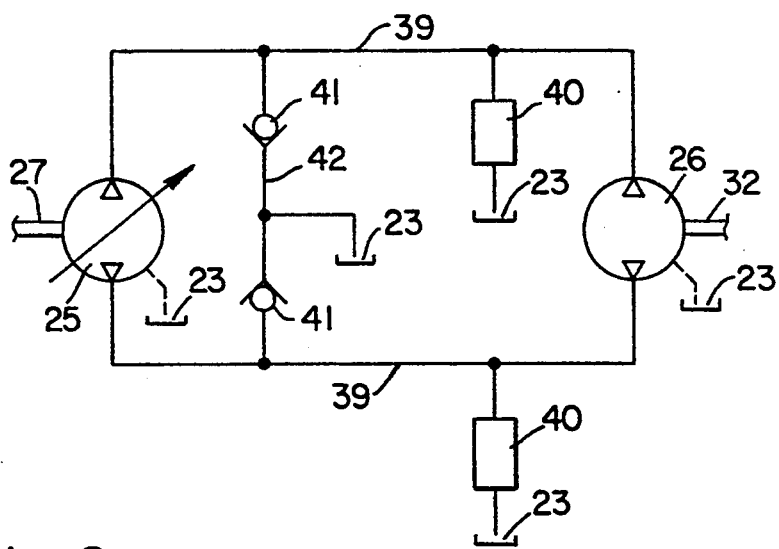
FIG. 1 is a diagram showing a hydraulic circuit of a hydrostatic continuously variable transmission.
Figure 2:
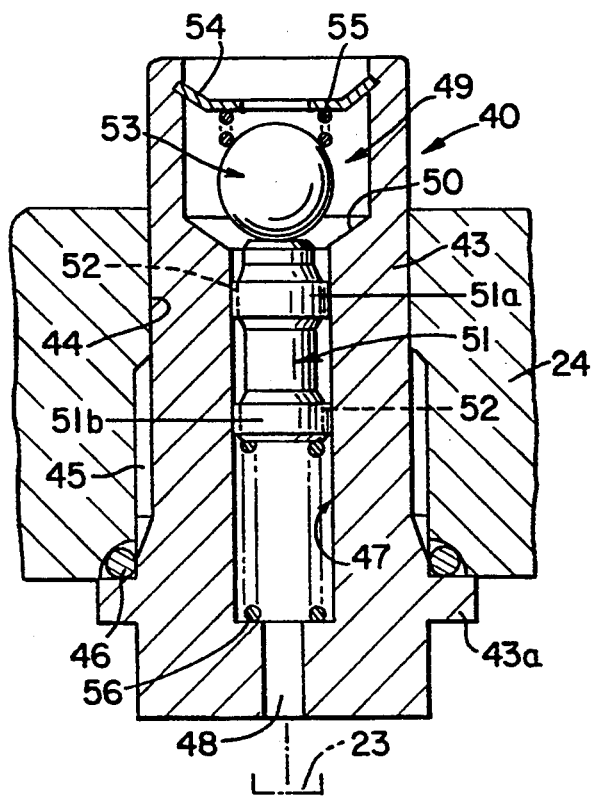
FIG. 2 is a cross-sectional view of each pressure-responsive valve in the hydrostatic continuously variable transmission.

Similarly to the FIGS. 2 and 3 of the parent application, a ball valve body 34 is movably positioned in a first oil chamber 36 and rests on an upstream end of the piston 16. The ball valve body 34 is normally urged in an axial direction to be seated on the tapered valve seat 38, thus closing the third oil chamber 48 (and the second oil chamber 18), by a coil spring 44 which is disposed under compression between the ball valve 48 and a ring-shaped spring seat 42.

Under bias of a coil spring 45, however, the piston 16 is normally biased upstream and toward the ball valve body 34. The piston 16 is axially displaced upstream with its upstream end abutting against the ball valve body 34, lifting the ball valve body 34 off the valve seat 38 against the spring force of the coil spring 45. Therefore, when the oil pressure in oil supply passage 46 is relatively low or lower than a predetermined pressure level $\alpha$ (i.e., when the swash plate of the hydraulic pump is in a neutral position or the low-pressure leakage oil is supplied from the hydraulic pump), the ball 34 is lifted off the valve seat 38 under the resiliency of the coil spring 44, thereby opening or bringing the first oil chamber 36 into communication with a third oil chamber 48 lying below the ball 34 and above the main body of the piston 16.

On the other hand, a force F (kg) is applied to the piston 16 from the ball and is approximately produced by two components, the coil spring 44 and the oil pressure P (in the oil supply passage 46), which are acting on the ball 34 tending to close the third oil chamber 48. Concurrently, a force F' (kg) is applied to the ball valve body 34 and is approximately produced by the coil spring 44 which is acting on the piston 16 (tending to open the third oil chamber 48). Moreover, the spring forces of the coil springs 45 and 44 are selected such that when the oil pressure P (kg/cm$^2$) in the oil supply passage 46 is nil or lower than the predetermined pressure level $\alpha$, the coil springs 44 and 45 are such as to keep the ball valve body 34 lifted off the valve seat 38.

When the oil pressure in the oil supply passage 46 is relatively high or higher than the predetermined pressure level $\alpha$ (for example, when the transmission is shifted off of the neutral position), the high-pressure oil flows from the oil supply passage 46 into the first oil chamber 36, forcing the ball valve body 34 to be seated on the valve seat 38 against the bias of the coil spring 44. When the ball valve body 34 is seated on the valve seat 38 under oil pressure in the first oil chamber 36, the ball valve body 34 pushes the piston 16 back into the second oil chamber 18 and breaks the communication of this oil chamber with the first oil chamber 36.

Therefore, on the assumption that the oil pressure P (kg/cm$^2$) in the oil supply passage 46 is $P_L$ and at that time the ball 34 is not seated on the valve seat 38 (the pressure-responsive valve 2a is open), the oil pressure component of the force F (kg) is equal to $(S_1 \times P_L)$ wherein $S_1$ is $\pi \times (d_1/2)^2$ which is an area (cm$_2$) under pressure with respect to the piston 16, $d_1$ being the diameter of the piston. If the oil pressure P (kg/cm$^2$) in the oil supply passage 46 is at a higher value, e.g., $P_H$ which is higher than the predetermined pressure level a the piston and ball are forced to be displaced downward and finally seated on the valve seat 38, thus closing the third oil chamber 48.

Thus, once the ball 34 is seated on the valve seat 38 and the first oil chamber 36 is out of communication with the third oil chamber 48, the oil pressure component of the force F to be applied to the piston 16 becomes $(S_2 \times P_H)$ wherein $S_2$ is $\pi \times (d_2/2)^2$ and $S_2$ is larger than $S_1$ (since $d_1 < d_2$). Here, if the oil pressure P rapidly becomes lower than $P_L$ when the ball 34 is seated on the valve seat 38, the ball 34 remains seated on the valve seat 38 on condition that $d_2$ is properly defined to be larger than $d_1$.

It is noted that, although the coil springs 44 and 45 are expanded or contracted with movements of the ball 34, such spring force changes are assumed to be very slight and thus disregarded in the above discussion.

Accordingly, the specific arrangement as mentioned above is able to advantageously prevent the ball 34 from unnecessarily and undesirably opening and closing the third oil chamber 48 upon engagement of the transmission, thus allowing the working vehicle to start smoothly without undue shocks and improving durability of the pressure-responsive valve 2a. The third oil chamber 48 is primarily defined to provide a good valve seat for the ball 34.

Once given the disclosure, many other features, modifications and improvements will become apparent to the skilled artisan. Such other modifications, features and improvements are, therefore, considered a part of this invention, the scope of which is to be determined by the following claims.

What is claimed:

1. A hydrostatic continuously variable transmission comprising:
    a hydraulic pump actuable by a power source for generating an oil pressure;
    a hydraulic motor drivable by the oil pressure generated by said hydraulic pump;
    an oil tank,
    oil passage means for supplying oil from said hydraulic pump to said hydraulic motor; and
    pressure-responsive valve means connected to said oil passage means for draining the oil from said oil passage means to the oil tank in response to a first oil pressure generated by said hydraulic pump and applied through said oil passage means, said pressure-responsive valve means being closable in response to a second oil pressure in said oil passage means higher than said first oil pressure, and said pressure-responsive valve means remaining closed upon changing of the oil pressure from the second oil pressure to an oil pressure below said second oil pressure.

2. A hydrostatic continuously variable transmission according to claim 1 wherein said pressure-responsive valve means comprises:

a ball valve including a ball having a diameter and a valve seat, a piston having a diameter and axially slidable into contact with said ball, spring means urging said ball and piston toward one another, said spring means causing said ball to be unseated from its valve seat with oil pressure below said first oil pressure.

3. A hydrostatic continuously variable transmission according to claim 2 wherein the diameter of said ball is greater than the diameter of said piston whereby said pressure responsive valve means remains closed when the oil pressure falls below said second oil pressure.

4. A hydrostatic continuously variable transmission comprising first, second and third chambers, first, second and third oil passage means, said first passage means directing fluid into said first chamber, a ball valve having a ball and a valve seat engageable by said ball disposed in said first chamber, a piston disposed in said second chamber, slidable into engagement with said ball, spring means for biasing said ball and said piston into engagement with one another, said spring means being such that in the absence of hydraulic fluid in said first passage means above a predetermined threshold pressure said ball is out of engagement with said valve seat, said piston having at least one channel permitting flow of hydraulic fluid from said first chamber into said second chamber through said third chamber upon said ball being out of engagement with said valve seat, said second passage means being in communication with said second chamber, said third passage being in communication with said first chamber upon said ball being out of engagement with said valve seat, said spring means being such that said ball is seated on said valve seat when pressure in said first channel is above said threshold pressure, said ball having a larger diameter than said piston whereby said ball is maintained on said valve seat upon pressure in said first chamber falling below said threshold pressure.

5. A pressure responsive valve connected to receive hydraulic fluid under pressure, said valve comprising a ball valve having a first and a second position said ball valve in said first position passing the hydraulic fluid to a tank and in said second position preventing the fluid from flowing to said tank, a valve seat, a ball initially biased to float in the hydraulic fluid off of said seat under an initial pressure $\alpha$, means for causing said ball to be seated in the presence of a fluid pressure above $\alpha$ by a prescribed pressure, and further means for maintaining said ball seated, once seated, when pressure falls again to a pressure $\alpha$.

6. A pressure responsive valve according to claim 5 connected to receive hydraulic fluid under pressure, wherein said valve further comprises a piston biased against said ball to initially move said ball off of its seat, said ball being of a sufficient diameter relative to said piston to remain seated, once seated, when the fluid pressure falls to a value of $\alpha$.

* * * * *